(12) United States Patent
Lao et al.

(10) Patent No.: US 10,302,187 B2
(45) Date of Patent: May 28, 2019

(54) REDUCTION GEAR HAVING AN EPICYCLIC GEAR TRAIN FOR A TURBINE ENGINE

(71) Applicant: SAFRAN AIRCRAFT ENGINES, Paris (FR)

(72) Inventors: Jérémy Phorla Lao, Moissy-Cramayel (FR); Olivier Belmonte, Moissy-Cramayel (FR); Clémentine Charlotte Marie Mouton, Moissy-Cramayel (FR); Thomas Julien Nguyen Van, Moissy-Cramayel (FR); Emmanuel Pierre Dimitri Patsouris, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 25 days.

(21) Appl. No.: 15/567,493

(22) PCT Filed: Apr. 21, 2016

(86) PCT No.: PCT/FR2016/050943
§ 371 (c)(1),
(2) Date: Oct. 18, 2017

(87) PCT Pub. No.: WO2017/005997
PCT Pub. Date: Jan. 12, 2017

(65) Prior Publication Data
US 2018/0163850 A1 Jun. 14, 2018

(30) Foreign Application Priority Data
Apr. 23, 2015 (FR) ...................................... 15 53675

(51) Int. Cl.
*F16H 57/08* (2006.01)
*F02C 7/36* (2006.01)
(Continued)

(52) U.S. Cl.
CPC ........... *F16H 57/082* (2013.01); *F01D 25/18* (2013.01); *F02C 7/36* (2013.01); *F02K 3/025* (2013.01);
(Continued)

(58) Field of Classification Search
None
See application file for complete search history.

(56) References Cited

U.S. PATENT DOCUMENTS 9,038,779 B2 * 5/2015 McCune ............. F16H 57/0423
184/6.11
10,006,539 B2 * 6/2018 Curlier ...................... F02C 7/36
2015/0300255 A1 10/2015 Gallet et al.

FOREIGN PATENT DOCUMENTS

FR 2987417 A1 8/2013
GB 2493834 A 2/2013
WO 2013/124590 A1 8/2013

OTHER PUBLICATIONS

Written Opinion of the International Searching Authority dated Feb. 9, 2017, issued in corresponding International Application No. PCT/FR2016/050943, filed Apr. 21, 2016, 5 pages.
(Continued)

*Primary Examiner* — Dirk Wright
(74) *Attorney, Agent, or Firm* — Christensen O'Connor Johnson Kindness PLLC

(57) ABSTRACT

A reduction gear having an epicyclic gear train for a turbine engine, in particular of an aircraft, comprising: a planetary shaft having an axis of rotation A; a ring gear having an axis A extending around said planetary shaft; planet gears distributed around said axis A, which mesh with said ring gear and the planetary shaft; and a planet carrier including members for supporting bearings of the planet gears, having axes of rotation B, which are evenly distributed around the axis A, as well as a part holding each supporting member
(Continued)

substantially by the middle thereof along the axis B thereof, wherein said supporting members are made as a single part having means for supplying lubricating oil to said bearings. A method for assembling said reduction gear is also provided.

13 Claims, 4 Drawing Sheets

(51) Int. Cl.
*F16H 57/04* (2010.01)
*F01D 25/18* (2006.01)
*F02K 3/02* (2006.01)

(52) U.S. Cl.
CPC ..... *F16H 57/0479* (2013.01); *F16H 57/0482* (2013.01); *F05D 2220/324* (2013.01); *F05D 2230/53* (2013.01); *F05D 2260/40311* (2013.01); *F16H 2057/085* (2013.01); *Y02T 50/671* (2013.01)

(56) References Cited

OTHER PUBLICATIONS

International Preliminary Report of Patentability dated Oct. 24, 2017, issued in corresponding International Application No. PCT/FR2016/050943, filed Apr. 21, 2016, 1 page.
International Search Report dated Feb. 9, 2017, issued in corresponding International Application No. PCT/FR2016/050943, filed Apr. 21, 2016, 2 pages.

\* cited by examiner

REDUCTION GEAR HAVING AN EPICYCLIC GEAR TRAIN FOR A TURBINE ENGINE

TECHNICAL FIELD

The present invention relates to the field of reduction gears having an epicyclic gear train and, especially although not exclusively, to reduction gears for turbine engines with a pair of contrarotating propulsion propellers. The invention relates more particularly to the integration of lubrication means in a reduction gear having an epicyclic gear train.

PRIOR ART

The architecture of turbine engines with a pair of contrarotating propellers, designated by the English expression "open rotor", is distinguished from that of the usual turbojet engines by the fact that the fan is no longer internal but external and that it is composed of two coaxial contrarotating propellers that can be situated upstream or downstream of the gas generator. Such an architecture gives rise to lower fuel consumption compared with the multiflow turbojet engines in service on commercial aircraft.

As shown schematically in FIG. 1, a turboshaft engine 1 with a pair of contrarotating upstream 2 and downstream 3 propellers comprises mainly, on a central longitudinal axis A, two distinct portions: a gas generating portion G and a propulsion portion P. The portion P, in this example of a turboshaft engine, extends the gas generating portion G and the nacelle 4.

The gas generating portion G of the turboshaft engine 1 usually comprises, from upstream to downstream in the direction of flow, with respect to the axis A, a gas flow F entering the nacelle 4 of the turboshaft engine, one or two compressors 7 depending on the architecture of the single- or twin-spool gas generator, an annular combustion chamber 8, and one or more turbines 9 connected to separate spools depending on said architecture. The propulsion portion comprises a power turbine, the shaft 10 of which, by means of a speed reduction device or reduction gear with an epicyclic gear train 11 (designated by the English acronym PGB, standing for power gear box) and in a contrarotating fashion, drives the concentric coaxial shafts 12 and 13 of the two aligned upstream 2 and downstream 3 propellers, along the axis A of the turboshaft engine. An exhaust nozzle 14 terminates the turboshaft engine 1 in the usual fashion. One such architecture is for example presented in the patent FR 2 955 085 A1 and the patent applications FR 2 962 109 A1 and FR 2 940 247 A1.

In operation and briefly, the airflow F entering the turboshaft engine 1 is compressed and then mixed with fuel and then burned in the combustion chamber 8. The combustion gases generated then pass into the turbine portion 9 in order, via the epicyclic reduction gear 11, to drive, in reverse rotation, the propellers 2, 3, which supply the major part of the thrust. The combustion gases are expelled through the exhaust nozzle 14, thus increasing the thrust of the turboshaft engine 1.

The purpose of the reduction gear (PGB) 11 of an open rotor is to transform the so-called rapid rotation speed of the power turbine 9, the power shaft 10 of which, cooperating with the sun gear 15 of the reduction gear 11, can be seen in FIG. 2, into two distinct so-called slow speeds of the two contrarotating propellers 3, 4. For this purpose, with reference to FIG. 2, the differential reduction gear 11 with epicyclic gear train comprises, with respect to the longitudinal axis A:

- the sun gear 15 in the form of a toothed wheel, which is mounted by a splined connection on the turbine shaft 10 turning in a rotation direction driving the reduction gear 11,
- planet gears 18, in this case three in number positioned at 120° with respect to one another (only one of them being shown in the figure), which are formed by toothed wheels 18a, 18b, meshing around the sun gear 15, and which are connected to a planet carrier 16 consequently turning in a rotation direction identical to the input shaft, and
- an outer toothed ring 19, which meshes with the planet gears 18 and turns in a rotation direction opposite to the sun gear 15 and therefore in the opposite direction to the planet carrier 16.

The example in FIG. 2 presents an inverted reduction gear 11, for which the shaft 12 of the upstream propeller 2 terminates, in the example presented, in an annular bulb, so as to be constrained to rotate with the planet carrier 16, and the shaft 13 of the downstream propeller 3 is constrained to rotate with the outer toothed ring 19.

With reference to FIGS. 2 and 3, a known reduction gear with epicyclic gear train comprises a planet support 17 with three individual supporting members 21 (only one being shown in FIG. 2), secured together by an annular part 20. Each individual supporting member 21 is in this case substantially in the form of a cylindrical tube. These cylindrical tubes 21, three in number (three planet gears), are parallel and each serve for the rotation of the wheels 18a, 18b of a planet gear 18 about an axis B connected to the individual support 20.

The external surface of each cylindrical tube 21 has a protrusion at the centre thereof, separating the tube into two portions. These portions in this case support two inner rings of identical anti-friction bearings 23a, 23b. These bearings 23a, 23b allow the rotation of the toothed wheels 18a, 18b of the planet gear 18 about the axis B.

Moreover, the cylindrical tubes are in a single piece, connected by an annular part 20, substantially at the middle thereof along the axis B. This annular part 20, not shown in FIG. 2, is bolted to the fingers 47 of the planet carrier 16, so as to drive it in rotation about the axis A.

The reduction gear 11 has the particularity of not having any static component and is considered to be a differential reduction gear with epicyclic gear train with, at its input, an initial rotation speed (that of the turbine) and, at its output, two separate rotation speeds with opposite directions (those of the two fan stages).

Thus, in order to guarantee optimum and reliable functioning of the reduction gear 11, it is essential to convey oil in order to lubricate and cool the rolling components that form it, having regard to the fact that this reduction gear is subjected to the various forces of the input (turbine) and output (propeller) shafts while being subjected to significant mechanical and thermal external stresses caused by the turbine engine.

For this purpose, the two cylindrical tube portions 21 described previously are pierced radially with holes regularly spaced apart over the circumference thereof, facing each bearing 23a, 23b, to allow a circulation of oil, denoted by the arrows T in FIG. 2, to these bearings.

Inside each supporting member 21, a planetary shaft 24, axisymmetric and frustoconical with respect to the axis B, begins upstream with a cylindrical portion with a radius appreciably less than that of the cylindrical tube 21 and joins the external periphery of the supporting member 21 downstream. This part 24 terminates downstream in a flange that projects radially beyond the cylinder 21 and makes it possible to block the bearing 23b axially in the downstream direction.

Upstream, a plate 25, having substantially the form of a disc, closes the space between the cylindrical tube 21 and the planetary shaft 24. It also makes it possible, by projecting radially beyond the cylinder 21, to axially block the bearing 23a in the upstream direction. Moreover, the plate 25 comprises an opening of the piercing type in its radially innermost portion with respect to the axis A of the reduction gear 11 in order to allow the oil to circulate as far as the bearings 23a and 23b (arrow T).

The plate 25 and the planetary shaft 24 form, with the cylinder 21, a cavity 26 putting the opening in the plate 25 in communication with the holes in the cylinder 21. When the reduction gear is functioning, the lubricating oil, the path of which is indicated by arrows T, passes through the opening in the upstream plate 25 and emerges from the cavity 26 through the holes in the cylindrical tube 21, in order to lubricate the bearings before being distributed in the gear units and next discharged by centrifugation. The particular form of the inner part 24 enables the oil to be distributed until the holes furthest away from the inlet opening in the cavity 26.

The three plates (one plate 24 per planet gear 18), associated with the cylindrical part 30, form the bottom cowl of an oil-transfer device 28, designed to transfer oil coming from an oil-supply source 27 situated in the fixed nacelle 4 to the rotating reference frame of the planet carrier 17.

This oil transfer device 28 rests directly on the external surface of the cylindrical part 31, referred to as the top cowl of the device 28. This top cowl 31 is fixed directly onto the bottom cowl formed by the three plates 25 and the cylinder 30. The top and bottom cowls then form a cavity 29 in which the oil coming from the device 28 circulates. All the parts 30, 31, 21, 25 and 24 make it possible to convey the oil from the device 28 to the bearings 23a and 23b in the direction of the arrows T.

The presence of a plurality of parts, including the inner frustoconical part 24 in each individual support 20, makes the reduction gear 11 heavier, which compromises the objective of reducing weight, in particular for open rotors. The volume of the pipes, in particular that of the cavity 26, also involves the presence of a mass of superfluous oil driven by the rotation of the planet support 17.

Moreover, in this design, parts dedicated to conveying the oil are involved in the uptake of forces and must therefore be oversized compared with their oil-transfer function.

Finally, assembling the planet carrier 17 and the planet gears on the planet carrier is complex because of the number of parts. With reference to FIG. 7, in the example in question, this assembly takes place in six steps with a large number of parts. A first step a) consists of installing, axially from an upstream and downstream direction, the inner rings of the bearings 23a, 23b on each cylindrical portion 21 of the planet support 17. In a second step b), the bottom cowl (a single-piece part consisting of portions 30 and 25) is assembled on the planet support 17, thus axially blocking the bottom rings of the bearing 23a on all the planet gears. In a third step c), the frustoconical parts 24 are placed from a downstream direction in axial abutment against the inner rings of the bearing 23b. In a fourth step d), the frustoconical parts 24 are bolted on the circular portion 25 of the bottom cowl for each planet gear. In fifth e) and sixth f) steps, the external cowl 31 of the oil-circulation cavity 29 is mounted and then bolted on the assembly obtained in step d).

The aim of the present invention is to afford a solution to the drawbacks mentioned above, in particular by simplifying the design of the assembly. It is particularly suited to a reduction gear with epicyclic gear train for a turbine engine with contrarotating propellers but can be used for other types of reduction gear with epicyclic gear train, used for example for driving the fan of a bypass turbine engine, whatever the number of planet gears on the reduction gear.

DISCLOSURE OF THE INVENTION

To this end, the invention relates to a reduction gear with epicyclic gear train for a turbine engine, in particular for an aircraft, comprising a planetary shaft having a rotation axis A, a ring having an axis A extending around said planetary shaft, planet gears distributed around said axis A, which are meshed with said ring and the planetary shaft, and a planet support comprising members for supporting bearings of the planet gears, having rotation axes B, which are evenly distributed around the axis A, and a part holding each supporting member substantially by the middle thereof along the axis B thereof, characterised in that said supporting members are formed in a single piece with means for supplying said bearings with lubricating oil.

Producing the members for supporting the bearings in a single piece with the oil-supply means thereof provides for simple assembly. In addition, by eliminating the part that in the prior art formed the radially inner wall of the supply chamber, weight and space savings can be made in each member.

According to one feature of the invention, the means for supplying said bearings with lubricating oil are formed in the wall of the supporting member.

According to another feature of the invention, the part has a limited axial extension configured so as to allow the arrangement thereof between the bearings.

Advantageously, said supporting members each have a hollow tubular form, preferably with a substantially circular cross section on the external periphery thereof. The means for supplying oil to the bearings in the members are therefore integrated into the thickness of the tube and free up the internal space of the tube.

Preferably, said means for supplying lubricating oil to said bearings comprise at least one external channel for the circulation of lubricating oil around the axis B in communication with the external periphery of said supporting members.

The external channel makes it possible to supply lubricating oil to the bearings of the planet gears over the entire circumference thereof, while supplying oil to the raceway over a portion of this circumference only, through the passage orifices. Because of this, it is no longer necessary to provide an internal chamber arranged so as to supply the entire circumference with lubricating oil and occupying a large portion of the space inside the cylindrical tube of the supporting member. This saves weight and simplifies assembly compared with the prior art.

Preferably, the external channels are substantially in a plane perpendicular to the axis B and have a circular cross section. Piercings are evenly distributed over the circumference of these channels, and are oriented towards the raceways of the bearings so that the lubricating oil can be injected.

Advantageously, said members each comprise at least one integrated duct arranged to put said at least one external channel in communication with an element distributing lubricating oil to the supporting members.

Advantageously, said supporting members are formed in a single piece with each other and with a tubular element for distributing lubricating oil, which extends around said axis A and comprises an annular duct for distributing oil to the supporting members.

Advantageously, said tubular element for distributing lubricating oil comprises an interface for a device for transferring oil between a fixed oil source with respect to the turbine engine and a planet support, rotating about the axis A.

Preferentially, said interface is arranged so as to make the oil radially enter the internal duct of said tubular element for distributing lubricating oil.

Advantageously, said duct communicates with said integrated chamber of each of said members.

Advantageously, said tubular element is connected by one of the longitudinal ends thereof to one of the longitudinal ends of each of said supporting members.

This makes it possible in particular to position the inlet of the internal duct of said tubular element for distributing lubricating oil at the portion of each member closest to the axis A.

Advantageously, each supporting member supports two bearings, respectively associated with two planet-gear wheels.

Advantageously, each supporting member comprises two raceways, each arranged to support at least one planet-gear bearing, and having different diameters. This makes it possible to mount two bearings axially on the member by the same longitudinal end of said member, in particular in order to mount two spaced-apart toothed wheels constituting the planet gear corresponding to said member.

Advantageously, the holding part is a part distinct from the supporting members.

Preferably, this holding part comprises, for each supporting member, a ring surrounding the latter between the two raceways.

The attached ring of each supporting member makes it possible to secure together said members of the planet support so as to transmit a torque to an output shaft, in particular a propeller or fan shaft. In addition, the fact that the ring is attached simplifies the mounting of the planet gear by axially installing, successively, the upstream bearing, the ring and then the downstream bearing.

The invention also relates to a turbine engine comprising a reduction gear as described above.

The invention also relates to a method for producing a reduction gear as described above, characterised in that the bearings and the holding part are mounted on the supporting members by translations all in the same direction along the axes B.

The features of said reduction gear therefore result in a simplified assembly and improved accessibility for maintenance.

BRIEF DESCRIPTION OF THE FIGURES

The present invention will be better understood and other details, features and advantages of the present invention will emerge more clearly from a reading of the description of a non-limitative example that follows, with reference to the accompanying drawings, in which.

It should be noted that the elements fulfilling identical functions bear the same reference numerals in the various figures.

DESCRIPTION OF AN EMBODIMENT

Figure 1:
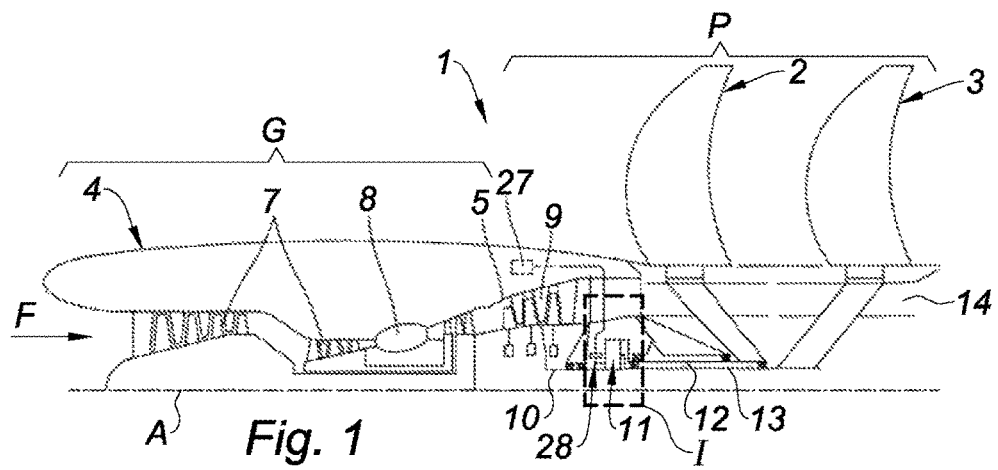
FIG. 1 is a schematic, longitudinal, half-sectional view of a turbine engine with a pair of contrarotating propellers, such as an "open rotor"
Figure 2:
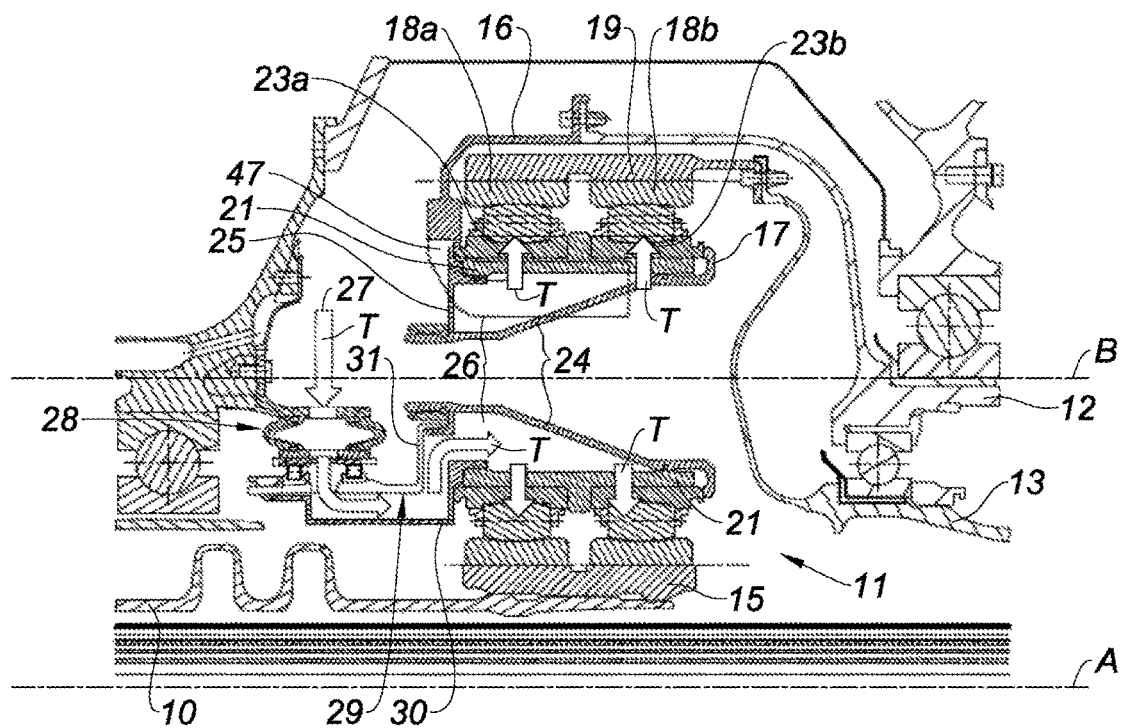
FIG. 2 shows, in a detailed longitudinal half-sectional view of the portion I in FIG. 1, an example embodiment of a reduction gear with epicyclic gear train according to the prior art.
Figure 3:
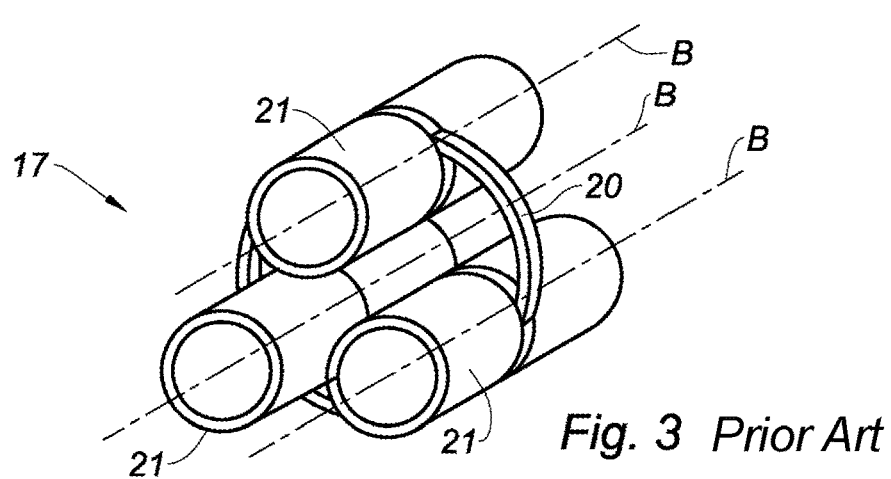
FIG. 3 shows a schematic, perspective view of a planet support according to the prior art used in the reduction gear with epicyclic gear train in FIG. 2.

The invention relates in particular to a reduction gear with epicyclic gear train in a turbine engine with a pair of contrarotating propellers, "open rotor", as described above, with reference to FIG. 1.

It should be noted however that this example is not limitative; the description of the invention that follows can easily be adapted by persons skilled in the art for example to the case of a reduction gear with epicyclic gear train for driving a fan in a bypass turbine engine.

Figure 4:
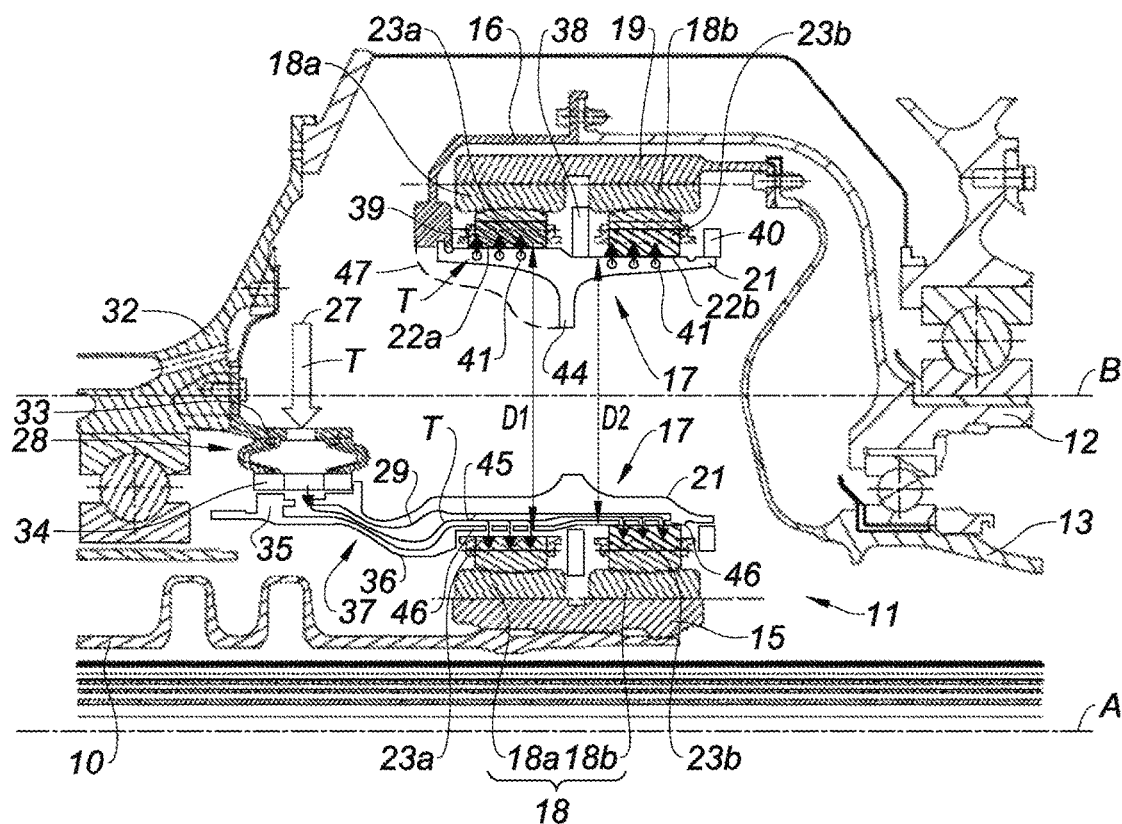
FIG. 4 shows, in a detailed longitudinal half-sectional view of the portion I in FIG. 1, an example embodiment of a reduction gear with epicyclic gear train according to the invention.

In this case, the general architecture of the reduction gear is similar to that described above. With reference to FIG. 4, the differential reduction gear 11 with epicyclic gear train comprises, with respect to the longitudinal axis A of the turbine engine:

a planetary input shaft 15, having a rotation axis A, in the form of a toothed wheel, which is mounted by a splined connection on the turbine shaft 10 turning in a rotation direction while driving the reduction gear 11, planet gears 18, in this case three in number, positioned at 120° to one another (two being shown in FIG. 5), which are each formed by two toothed wheels 18a, 18b, meshing around the input shaft 15, and which are supported by a planet support 17 turning, consequently, in a rotation direction identical to the input shaft 15, and an outer toothed ring 19, which meshes with the toothed wheels 18a, 18b of the planet gears 18 and which turns in the opposite rotation direction to the input shaft 15, and therefore in the opposite direction to the planet carrier 16.

The downstream side of the reduction gear 11 being turned towards the propellers 2, 3, the shaft 12 of the upstream propeller 2 terminates in an annular bulb, in order to be constrained to rotate with the planet carrier 16 connected to the planet support 17, while the shaft 13 of the downstream propeller 3 is constrained to rotate with the outer toothed ring 19.

Figure 5:
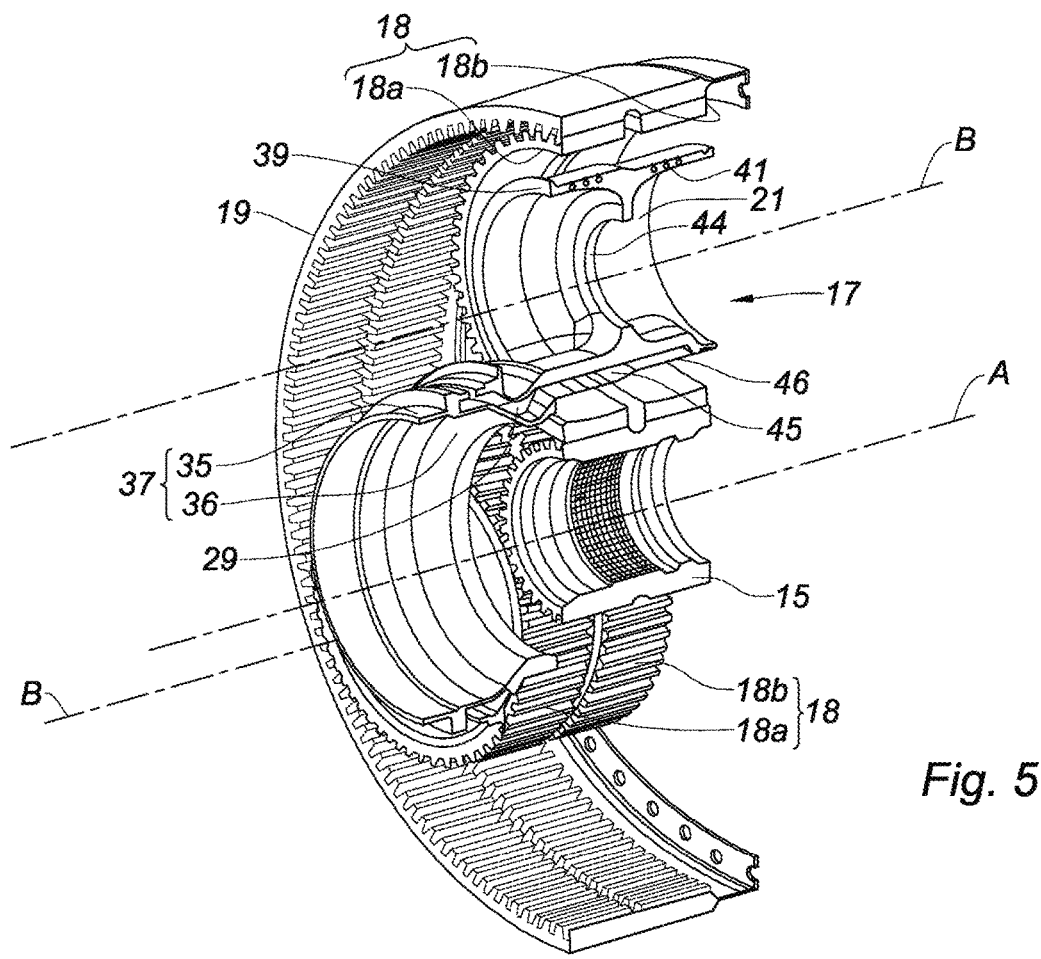
FIG. 5 shows a partial perspective view of the main elements of a reduction gear with epicyclic gear train according to the invention.
Figure 6:
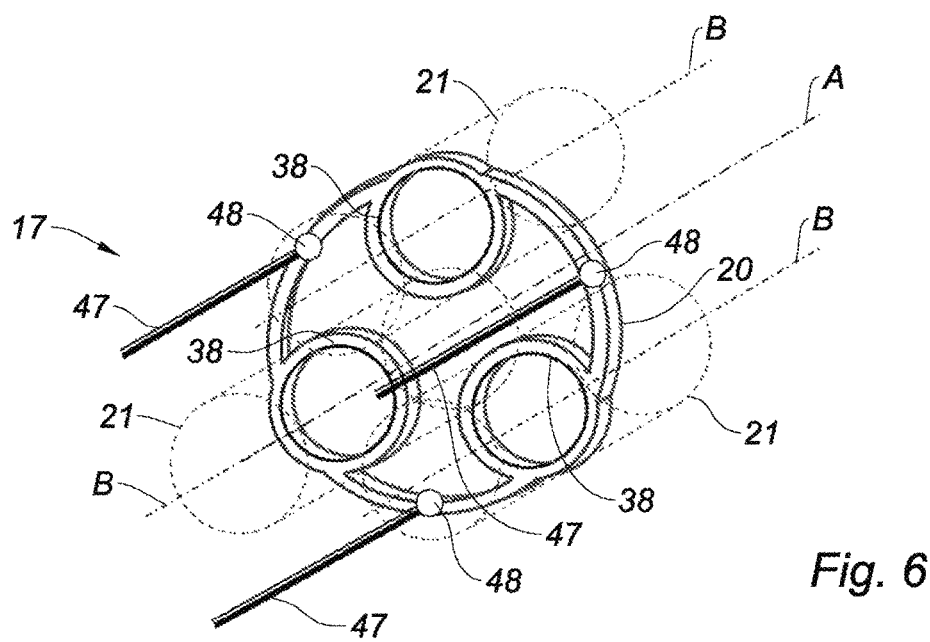
FIG. 6 shows a schematic, perspective view of a planet support used in the reduction gear with epicyclic gear train in FIG. 4.
Figure 7:
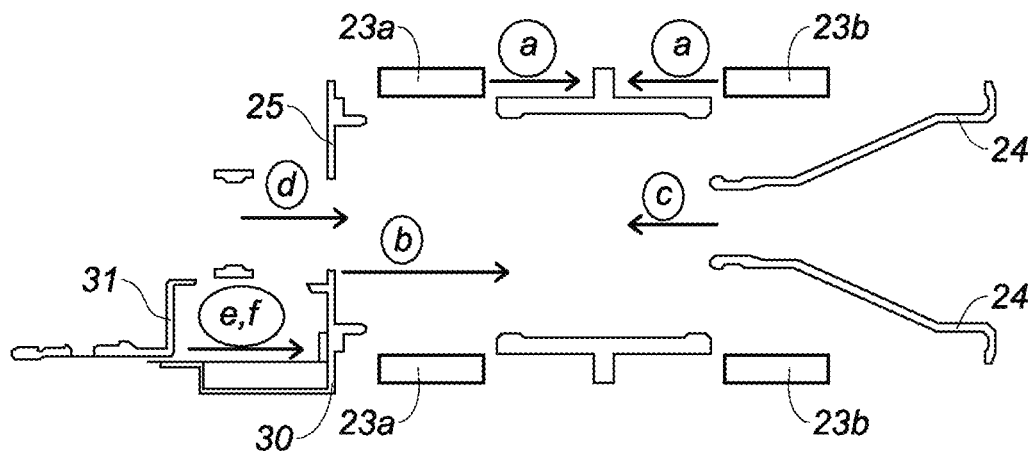
FIG. 7 schematically shows the steps of assembling a planet carrier for a reduction gear with epicyclic gear train according to the prior art.

With reference to FIGS. 5 and 6, the planet support 17 comprises in this case three members 21 supporting the planet gears 18, each defining a rotation axis B of said planet gears 18, parallel to the axis A and evenly distributed at 120° to one another, around said axis A. More precisely, the supporting members each have an axial extension along the axis B. The reduction gear also comprises a part 20, 38 holding each supporting member 21 substantially by the middle of the axial extension thereof. These supporting members 21 in this case consist of essentially cylindrical hollow tubes 21 around each axis A, held securely to each other by an annular flange 20. The supporting member 21 is preferentially manufactured by an additive manufacturing method.

The annular flange 20 comprises a connecting ring 38 associated with each cylindrical tube 21 arranged so as to hold each cylindrical tube 21 substantially by the middle of the axial extension thereof. In other words, we understand that each ring 38 holds a cylindrical tube 21 substantially at the middle of the length thereof. The connecting ring 38 surrounds the external surface of each cylindrical tube 21, so as to be placed between the upstream 18a and downstream 18b wheels of the planet gear. As shown in FIG. 6, the annular flange 20 and the connecting ring 38 have a limited or reduced axial extension. The limited axial extension of the connecting ring 38 and of the annular flange 20 is configured so as to allow the arrangement thereof between bearings 23a and 23b described below. In other words, the annular flange 20 and the ring 38 have an almost flat shape (small thickness). This simple shape facilitates manufacture by conventional methods such as forging. Moreover, the extension and volume thereof are restricted so as to limit the mass thereof. This configuration also requires little machining. The thickness is also limited or small compared with the other parts constituting the reduction gear 11, and in particular the axial extension of the cylindrical tube 21. Moreover, the annular flange 20 and the connecting ring 38 are produced from a material sized so as to transmit the forces from the planet gears.

In an embodiment shown in FIG. 5, fingers 47 connect the planet carrier 16 to the annular flange 20 of the planet support 17, between the cylindrical tubes 21. The fingers 47 are preferentially fixed to the annular flange 20 by ball joints 48 in order to form an isostatic assembly.

In an alternative embodiment, not shown, the fingers 47 can pass inside the cylindrical tubes and be fixed, also preferably by a ball-joint link substantially to the middle of the cylindrical tubes 21, at the connecting rings 38. This is because, as is clear from the remainder of the description, the interior of the cylindrical tubes 21 is left clear and provides a passage for the fingers 47, in the reduction gear 11 according to the invention. Moreover, the radially internal surface of each cylindrical tube 21 can have a rib 44, substantially at the middle thereof along the axis B, improving the mechanical strength thereof and able to be used as an attachment for fixing the fingers 47.

Each tubular supporting member 21 serves as a support for bearings 23a, 23b of the corresponding planet gears 18. In this case, an upstream bearing 23a and a downstream bearing 23b respectively allow the rotation of the upstream 18a and downstream 18b toothed wheels of each planet gear 18 about the axis B.

In the example presented, these are bearings 23a, 23b each comprising an inner ring centred on the cylindrical tube 21, an outer ring centred on a toothed wheel 18a, 18b, allowing the rotation of the toothed wheels about the cylindrical tube 21.

The radially external surface of each cylindrical tube 21 comprises in this case an upstream cylindrical raceway 22a, having a first diameter D1, and a downstream cylindrical raceway 22b, having a second diameter D2 that is slightly less than D1. The upstream cylindrical raceway 22a supports the inner ring of the upstream bearing 23a, while the downstream cylindrical raceway 22b supports the inner ring of the downstream bearing 23b.

The bearings 23a, 23b are bearings with rolling elements such as balls, rollers or needles. Preferentially, but non-limitatively, the elements are barrel rollers (in contradistinction to straight rollers).

It should be noted in this regard that the connecting ring 38 has an inside diameter corresponding to the inside diameter D2 of the downstream raceway 22a. When the planet support 17 is assembled, the connecting ring 38 is therefore positioned in abutment at the interface between the upstream 22a and downstream 22b raceways, between the two bearings 23a and 23b. In this way, the flange 20 can pass between the upstream 23a and downstream 23b bearings, as well as between the upstream 18a and downstream 18b toothed wheels, in order to secure the connecting rings 38.

The planet support 17 according to the invention, illustrated in detail with regard to FIGS. 4 and 5, allows the lubricating oil to be carried to the rotating elements 23a, 23b, 18a, 18b, at the periphery of the cylindrical tubes 21. The path of the oil is symbolised by arrows T.

As in the prior art previously described, an oil-transfer device 28 is in this case provided for transferring the oil from an oil-supply source 27 situated in the fixed nacelle 4 to the rotating reference frame of the planet support 17. The device 28 is situated in an annular internal space of the turboshaft engine 1, situated around the turbine shaft 10 and delimited between a fixed casing 32 and the upstream side of the reduction gear 11 with epicyclic gear train.

With reference to FIG. 4, the transfer device 28 mainly comprises two concentric external 33 and internal 34 rings, spaced radially apart from each other, the outer ring 33 being fixed to a static casing 32 of the turbine engine and the inner ring 34 being fixed to the planet support 17 of the reduction gear 11.

In order to pass rotation between the fixed outer ring 33 connected to the static casing 32 (fixed reference frame) and the rotating inner ring 34 connected to the planet support 17 (rotating reference frame), plain bearings or anti-friction bearings are arranged between the rings. Advantageously, bearings with rolling elements are used. In general, spherical rollers cooperating with straight teeth are chosen, or cylindrical rollers cooperating with herringbone teeth or helical teeth are chosen in order not to hold the planet gears in an axial position with respect to the sun gear and the ring but without making the system hyperstatic.

The outer ring 33 is connected to a supply channel emerging from the oil source 27 and comprises an opening allowing the oil to pass radially therethrough.

Means, not forming part of the invention, connect the outer 33 and inner 34 rings to each other and are arranged so as to allow the oil to pass to the inner ring 34.

The inner ring 34 is itself pierced with radial openings to allow the oil to pass.

An intermediate tubular part 37 around the axis A of the reduction gear 11, or oil-distribution housing, secured to the rotary planet support 17, is intended to convey the oil emerging from the inner ring 34 of the transfer device 28 to each cylindrical tube 21.

The oil distribution housing 37 comprises an upstream portion 35 with a substantially cylindrical shape around the axis A, which supports the inner ring 34 on the external periphery thereof. A downstream portion 36 forms the connection with each cylindrical tube 21.

In the thickness of the oil-distribution housing 37, a cavity 29 is provided in order to form a duct conveying the oil in a downstream-to-upstream direction. This duct 29 is annular at least in the upstream portion 35 of the housing 37. The duct 29 emerges on the external periphery of the upstream portion 35 so as to be in communication with the orifices in the inner ring 34 of the oil transfer device 28. The duct 29 also emerges at the free ends of the downstream portion 36, inside each cylindrical tube 21.

Preferably, the whole of the oil-distribution housing 37 remains radially close to the input shaft 15. The duct 29 therefore emerges downstream at the portion of the cylindrical tubes 21 closest to the axis A of the reduction gear 11.

Each cylindrical tube 21 has a substantially constant thickness over the circumference thereof, except in the portion thereof that is the closest to the axis A of the reduction gear 11. At this portion, an internal duct 45 is provided in the thickness of the cylindrical tube 21 and, at the upstream end thereof, communicates with the corresponding downstream opening of the internal duct 29 of the distribution housing 37. The internal duct 45 is situated in a limited angular sector of the cylindrical tube, on either side of the plane passing through the axis B of the cylindrical tube 21 and the axis A of the reduction gear 11. It is in this case symmetrical about this plane. In an alternative, this internal duct 45 can be multiple in order to distribute the oil more homogeneously over an angular sector.

The duct 45 extends axially over substantially the entire length of the cylindrical tube 21. In particular it extends in front of the two bearings 23a, 23b. It is closed laterally and downstream.

The radially internal wall of the duct 45 with respect to the axis B has substantially the same thickness as that of the cylindrical tube 21, outside the duct 45, and contributes to the mechanical strength of the cylindrical tube, as well as to forming the connection with the distribution housing 37.

In this case, the radial extension of the internal duct 45 has a value substantially equal to that of the thickness of the cylindrical tube 21. Because of this, the cylindrical tube 21 forms a tubular part, the internal space of which is largely left clear.

The radially external wall of the internal duct 45 with respect to the axis B is for its part situated in line with the external surface of the cylindrical tube. The thickness thereof is suitable for supporting the bearings 23a, 23b.

The radially external wall of the internal duct 45 is penetrated by substantially radial orifices 46, putting the internal duct 45 in communication with the external surface of the cylindrical tube 21, at the upstream 22a and downstream 22b raceways of the anti-friction bearings 23a, 23b.

Because of this, the oil coming from the distribution housing 37, the path of which is symbolised by the arrows T, enters the duct 45 upstream and emerges on the external surface of the cylindrical tube through the orifices 46. Adjusting the form of the duct 45 and/or of the orifices 46 in order to distribute in a substantially homogeneous manner the flow of oil arriving at the surface of the cylindrical tube facing the bearings 23a, 23b falls within the experience of a person skilled in the art.

The upstream 22a and downstream 22b raceways of the cylindrical tube 21 comprise a plurality of circumferential channels 41, spaced axially apart and positioned so that there is a plurality thereof in front of each bearing 23a, 23b, for example at least three. In other words, the channels 41 are formed in the wall of the cylindrical tube 21 and in particular in the thickness thereof.

These channels 41 are in this case in planes substantially perpendicular to the axis A. In addition, they are positioned so as to communicate with the oil outlet orifices 46 of the internal duct 45. In the example presented, the orifices 46 can be radial slots on which the channels 41 run. Alternatively, the channels 41 can fully encircle the cylinder 21 and the orifices 46 emerge at the bottom of the channels 41, the latter having for example a form secant to the duct 45.

In this way, a portion of the oil emerging from each orifice 46 goes directly into the portion of the bearing 23a, 23b situated facing the orifice 46, and another portion flows into the channel 41 that communicates with said orifice 46.

The channels 41 have for example an O-shaped cross section, open at just one point, or a U-shaped cross section open continuously over the external surface of the cylindrical tube 21. This cross section is adapted so as to improve the circumferential circulation of the oil around the cylindrical tube in the channel 41, while enabling the oil to escape, in an even manner substantially over the circumference, towards the bearings 23a, 23b through the opening of the channel on the external surface. This phenomenon is assisted by the combined effects of centrifugation resulting from the rotation of the planet support 17 and the driving of the bearings around the cylindrical tube 21.

According to known processes and means, not forming part of the invention, the oil reaching the bearings 23a, 23b passes therethrough in order to lubricate the gear units between each planet gear 18 and the toothed wheel 19, and is then discharged from the reduction gear 11.

It should also be noted that, in the example presented, the cylindrical tube 21 comprises as an integral part thereof, an upstream flange 39 at the end of the upstream portion of the external surface, and that a nut 40 is fixed downstream of the downstream portion of the external surface. This upstream flange 39 and downstream nut 40 form axial stops that hold the bearings 23a, 23b and the connecting ring 38 in position.

Figure 8:
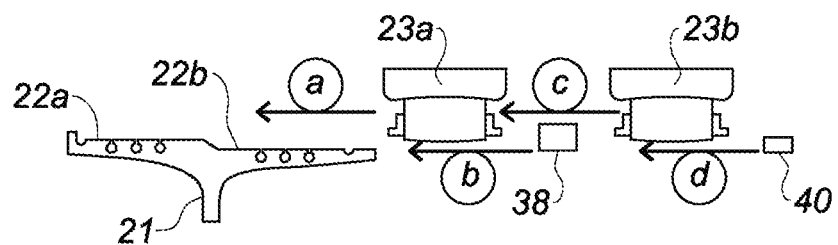
FIG. 8 schematically shows the steps of assembling a planet carrier for a reduction gear with epicyclic gear train according to the invention.
Figure 8:
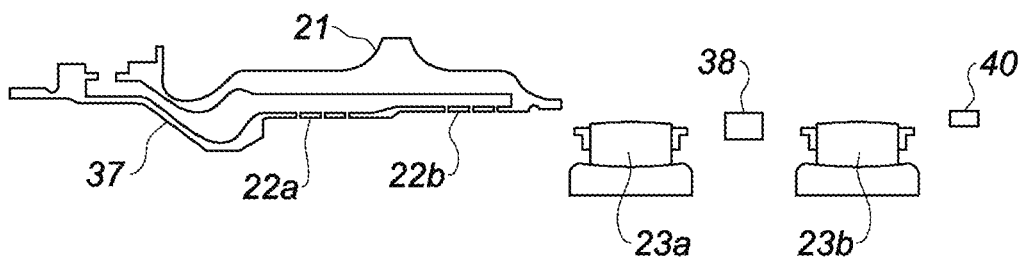

Preferably, the distribution housing 29 and the cylindrical tubes 21 can be produced in a single piece, for example by forging. In all cases, the assembly forms a part facilitating the mounting of the planet support 17. With reference to FIG. 8, this mounting takes place in four steps, all corresponding to a mounting of the parts on the cylindrical tubes 21 by translation along the axis B, in the downstream-to-upstream direction, preferably using an integrated assembly formed by the oil-distribution housing 37 and, in this case, the three cylindrical tubes 21 supporting the planet gears.

A first step a) consists of installing the upstream bearings 23a on the upstream raceway 22a of each cylindrical tube 21, by inserting them from the downstream side of the cylindrical tubes 21, which is free, whereas the upstream side is blocked by the presence of the distribution housing 37.

In a second step b), the flange 20 is installed by inserting the connecting rings 38 from the downstream side of the cylindrical tubes 21, and then sliding them so as to position them at the interface between the upstream raceway 22a and the downstream raceway 22b of each cylindrical tube 21.

In a third step c), the downstream bearings 23b are installed on the downstream raceway 22b of each cylindrical tube 21, still passing via the downstream end.

In a fourth step d), a nut 40 acting as an axial stop for the bearings 23a, 23b and the connecting ring 38, is tightened at the downstream end of each cylindrical tube 21.

Thus, by virtue of the raceways of the bearings, which do not have the same diameter, and by virtue of the space left clear in the cylindrical tubes 21, it is possible to assemble the planet support of the reduction gear with fewer parts and from only one side. This results in reduced handling of the parts and a lesser number of steps necessary for assembly compared with conventional systems. The holding flange 20 and the rings 38 thereof are easily accessible. Not needing to access both sides facilitates the maintenance of the reduction gear since, in this case, a portion of the planet support and the planet gears can remain mounted on the rest of the module in order to change certain parts only.

The invention claimed is:

1. A reduction gear with epicyclic gear train for a turbine engine suitable for an aircraft, comprising:
   a planetary shaft having a rotation axis A;
   a ring extending around said planetary shaft and being coaxial therewith;
   planet gears distributed around said axis A, which are meshed with said ring and the planetary shaft; and
   a planet support comprising members configured for supporting bearings of the planet gears, the supporting members having an axial extension along a rotation axis B and being evenly distributed around the axis A, and a part holding each supporting member,
   wherein the part holds each supporting member substantially by the middle of the axial extension thereof along the axis B thereof, and said supporting members are formed in a single piece with means for supplying said bearings with lubricating oil.

2. The reduction gear according to claim 1, wherein the means for supplying said bearings with lubricating oil are formed in the wall of the supporting member.

3. The reduction gear according to claim 1, wherein the part has a limited axial extension configured so as to allow the arrangement thereof between the bearings.

4. The reduction gear according to claim 1, wherein said supporting members each have a hollow tubular shape.

5. The reduction gear according to claim 1, wherein said means for supplying said bearings with lubricating oil comprise at least one external channel for circulating lubricating oil around the axis B in communication with the external periphery of said supporting members.

6. The reduction gear according to claim 1, wherein said supporting members are formed in a single piece with each other and with a tubular lubricating oil-distribution element, which extends around said axis A and which comprises an annular duct for distributing oil to the supporting members.

7. The reduction gear according to claim 6, wherein said tubular element is connected by one of the longitudinal ends thereof to one of the longitudinal ends of each of said supporting members.

8. The reduction gear according to claim 1, wherein each supporting member comprises two raceways, each arranged so as to support at least one planet-gear bearing, and having different diameters.

9. The reduction gear according to claim 1, wherein the holding part is a part distinct from the supporting members.

10. The reduction gear according to claim 8, wherein the holding part comprises, for each supporting member, a ring surrounding the latter between the two raceways.

11. A turbine engine comprising at least one reduction gear according to claim 1.

12. A method for producing a reduction gear according to claim 10, comprising mounting the bearings and the holding part on the supporting members by translations all in the same direction along the axes B.

13. The reduction gear according to claim 4, wherein said supporting members each have a hollow tubular shape with a substantially circular cross section over the external periphery thereof.

* * * * *